United States Patent [19]

Rafler et al.

[11] Patent Number: 5,760,119
[45] Date of Patent: Jun. 2, 1998

[54] METHOD OF STABILIZING A MELT OF ALIPHATIC AND AROMATIC-ALIPHATIC POLYESTERS

[75] Inventors: Gerald Rafler, Potsdam; Olaf Wachsen, Frankfurt; Karl-Heinz Reichert, Berlin, all of Germany

[73] Assignee: Fraunhofer-Gesellschaft zur Forderung der Angewandten Forschung e.V., Munich, Germany

[21] Appl. No.: 725,051

[22] Filed: Oct. 2, 1996

[30] Foreign Application Priority Data

Oct. 6, 1995 [DE] Germany ............... 195 37 365.0

[51] Int. Cl.⁶ .................................................. C08K 5/132
[52] U.S. Cl. .................................. 524/324; 524/336
[58] Field of Search ............................ 524/490, 324, 524/345, 336; 525/437, 444, 450; 528/201, 308.7, 308.8, 300, 496, 497

[56] References Cited

U.S. PATENT DOCUMENTS

| | | | |
|---|---|---|---|
| 3,441,540 | 4/1969 | Müller et al. | |
| 3,817,966 | 6/1974 | Beck | 524/324 |
| 4,065,440 | 12/1977 | Serres, Jr. | |
| 4,159,314 | 6/1979 | Ford | 424/14 |
| 4,181,545 | 1/1980 | Anderson | 568/701 |
| 4,474,918 | 10/1984 | Seymour et al. | 524/324 |
| 4,656,192 | 4/1987 | Yamato | 514/564 |
| 5,102,956 | 4/1992 | Farley | 525/285 |
| 5,110,849 | 5/1992 | Karasawa et al. | 524/324 |
| 5,248,668 | 9/1993 | Wu | 514/25 |

FOREIGN PATENT DOCUMENTS

| | | |
|---|---|---|
| 45278 | 1/1966 | German Dem. Rep. |
| 2400098 | 7/1974 | Germany |
| 2501988 | 7/1976 | Germany |
| 2556317 | 6/1977 | Germany |
| 4102170 | 8/1992 | Germany |
| 48-62894 | 9/1973 | Japan |

OTHER PUBLICATIONS

Ludewig, "Polyesterfasern, Chemie und Technologie" (Polyester Fibers, Chemistry and Technology)(1975), pp. 132–139.

H. Zimmerman: "Degradation and Stabilization of Polyesters", pp. 79–119.

G. Rafler, J. Dahlman: Biologisch Abbaubare Polymere (Biodegradable Polymers). 2.Mitt: Zur Homo–und Copolymerisation von D, L–Dilactide (On Homo–and Copolymerisation of D, L–Dilactide), Acta Polymerica, vol. 41, No. 12, pp. 611–617 (1990).

G. Rafler, J. Dahlman: "Biodegradable Polymers. 6th comm. Polymerization of ε–Caprolactone", Acta Polymer vol. 43, pp. 91–95 (1992).

M. Neliβen, H. Keul, H. Höcker: "Ring–closing Depolymerisation of Poly(ε–caprolactone)", Macromol. Che. Phys. vol. 196, pp. 1645–1661 (1995).

G. Rafler, F. Tesch, D. Kunath: Zur Katalyse der Polyesterbildung durch Metallalkoxide (On the Catalysis of Polyester Formation by Metal Alkoxides), Acta Polymerica, vol. 39, No. 6, pp. 315–320 (1988).

Primary Examiner—Veronica P. Hoke
Attorney, Agent, or Firm—Greenblum & Bernstein P.L.C.

[57] ABSTRACT

A method of stabilization of a melt viscosity of aliphatic- and/or aromatic homo- and/or co-polyesters containing catalysts and/or initiators, involves adding a masking agent which is tropon, α-tropolon, thujaplicin, pupurogallin or mixtures thereof to a melt resulting during synthesis of polyesters or during regeneration of polyesters.

13 Claims, No Drawings

METHOD OF STABILIZING A MELT OF ALIPHATIC AND AROMATIC-ALIPHATIC POLYESTERS

BACKGROUND OF THE INVENTION

1. Field of the Invention

The invention relates to a method of stabilizing aliphatic and/or aromatic-aliphatic polyesters against thermal and/or thermo-oxidative decomposition during deformation out of the molten phase to form yarns, films or moulded parts as well as during material recycling by means of melt separation processes.

2. Discussion of Background

Depending on the chemical structure, commercially available polyesters are produced by melt polycondensation of bi-functional monomers or by ring opening polymerisation of special cyclic esters or diesters. Both methods utilize suitable metal compounds to accelerate the polymer formation or in order to initiate and catalyse the chain growth.

From H. Zimmermann: Degradation and Stablization of Polyesters; N. Grassie: Developments in Polymer Degradation. vol. 5, London, N.Y.: Applied Science Publishers, 1984 it is known, that these metal compounds not only catalyze the chain growth reaction, but to a varying degree in addition to other factors such as temperature, atmospheric oxygen, or formed by-products, also contribute to undesirable decomposition processes. The mechanism and kinetics of the developing decomposition reactions and the type and quantity of the decomposition products formed are, according to H. Ludewig: Polyesterfasern, Chemie und Technologie: (Polyester Fibres, Chemistry and Technology) Berlin, Akademie-Verlag, 1975, above all dependent on the chemical structure of the polyester and on the function of the metal compound in formation of the polymer. Relevant decomposition processes for polyesters are above all thermal ester group separation of established ester groups with the formation of carboxyl-and alkyl ester end groups, as well as the ester end group separation with the formation of carboxyl end groups and hydroxylalkenyls of the dioles underlying the polyesters. These decomposition reactions are observed in various degrees in all aliphatic and aliphatic-aromatic polyesters. In the case of the aliphatic polyesters representable by ring opening polymerisation of the 2-, 4- or 6-hydroxycarboxylic acids, the thermal stability is in addition increasingly reduced as, in addition to the irreversible thermolysis reactions of the ester groups already named due to the equilibrium character of this special polymerisation, depolymerisation processes take place with regeneration of the cyclic monomers or formation of macrocycles. See in this respect G. Rafler, J. Dahlmann: Biologisch abbaubaré Polymere (Biodegradable Polymers). 2. Mitt.: Zur Homo- und Copolymerisation von D, L-Dilactide (On Homo- and Copolymerisation of D, L-Dilactide). Acta polymerica 41 (1990) 611; G. Rafler, J. Dahlmann: Biodegradable polymers. 6th comm.: Polymerization of caprolactone. Acta polymerica 43 (1992) 91; M. NeliBen, H. Keul, H. H ocker: Ring-closing depolymerisation of polycaprolactone. Macromol. Che. Phys. 196 (1995) 1645. Decomposition processes occur in polyesters both in manufacture and in deformation or during recycling in the molten phase. Under polycondensation or polymerisation conditions, thermolysis processes lead to a reduction in the macroscopic polymerization speed and in many cases to a restriction of the median molar mass which can be achieved. During processing and recycling, they above all cause reductions in molar mass and the formation of by-products; under the specific processing or recycling conditions, these by-products then mostly also remain in the material and frequently lead to a reduction in the utility value of products made from this plastic.

In order to minimize the influence of thermolysis processes, various strategies are followed, with 1) the use of higher-molecular polyesters including the generation of branched structures in order to compensate for the decomposition, 2) use of activated by- or higher- functional compounds for chain extension over end group linkage, 3) blocking of the catalysts used by a conversion into insoluble compounds, the applicability of these being determined by a plurality of chemical, applicative and economic factors. Whereas the procedure named under Point 1 compensates only for the effects of decomposition processes and represents no stabilization, a few typical examples will be shown for the procedures stated under Points 2 and 3, which will illustrate the principles underlying the compounds used and their effects. Typical activated bi- or higher- functional compounds for melt stabilisation of aliphatic-aromatic polyesters, such as polyethylene (PEPT) and polybutyleneterephthalate (PBTP) are carbodiimides (DE-OS 2556317), 2,2-dialkyl-1,3-dioxane-dione-4,6 (cyclic malonic acid esters) (U.S. Pat. No. 4,065,440), phenol esters of dicarboxylic acids and carbon dioxide (JA-PS 7421497; JA-PS 7362894) and multifunctional epoxides (DE-OS 2400098; DE-OS 2501988).

The stabilization with boracic acid and the presence of further compounds containing OH and COOH, described for an aliphatic polyester of 3-hydroxybutyric acid, described in DE-OS 4102170, utilises end group reactions in the substrate for proportional compensation of thermolysis and depolymerisation processes occurring in the melt.

The catalysts on the basis of bivalent metals (manganese, cobalt, lead, zinc, calcium) used in PETP manufacture on the basis of dimethylterephalate and ethylene glycol, not only accelerate the ester interchange reactions relevant to the process, but they also activate the thermal ester group separation. By means of adding phosphoric acid or phosphorous acid esters, these catalysts are converted into insoluble and thus catalytically inactive derivates (DD-PS 45278; U.S. Pat. No. 3,441,540). Due to their high effectiveness against a plurality of metal compounds, these esters of phosphoric or phosphorous acid are also used in industrial polyester processes for blocking metal traces from apparatus and pipelines. The activity of the likewise catalytically active compounds of the formally higher- value metal ions of the fourth main and secondary group and of the fifth main group of the periodic system of the elements, particularly those of antimony, germanium, titanium and tin compounds is not influenced by these esters (H. Zimmermann: Degradation and Stabilisation of Polyesters; in N. Grassie: Developments in Polymer Degradation. Vol. 5; London, N.Y.: Applied Science Publishers, 1984; G. Rafler, F. Tesch, D. Kunath: Zur Katalyse der Polyesterbildung durch Metallalkoxide. (On the Catalysis of Polyester Formation by Metal Alkoxides) Acta polymerica 39 (1988) 315).

SUMMARY OF THE INVENTION

Proceeding from this basis it is the object of the present invention to provide a method and a corresponding means for carrying out the method, by means of which polyesters are stabilized against reversible and irreversible decomposition processes in the molten phase.

It is therefore proposed according to the invention that the polyester melt resulting during polymer synthesis or during regeneration has added thereto a masking agent containing a compound which has at least one tropon ring. The method according to the invention may thus be applied both in the case of industrial polyester materials such as polyethylene and polybutylene terephthalate as well as in resorbable polyesters, such as polylactic acid or polyglycolic acid used in the case of biodegradable polyesters and polyesters used in medicine and industry and for galenic medical purposes.

DETAILED DESCRIPTION

The essential factor in the method according to the invention is that a masking agent is used which contains at least one tropon ring. Surprisingly, it was noted that when using such a masking agent a stabilization of the molten phase can be achieved which is clearly superior in comparison to prior art. It is preferred in this respect if the masking agent contains a compound selected from tropon, α-tropolon, thujaplicin, purpurogallin or its derivatives or mixtures thereof. A clearly increased stabilization compared to prior art is obviously to be ascribed to a complex chemical masking of the metal compounds. Thus the invention encompasses all masking agents with a tropolon ring, insofar as complex chemical masking of the metal compound is possible.

It is preferred in this respect if the masking agent is added in excess in proportion to the initiator/catalyst, the inert behavior with respect to the polyester also permitting high stabilization additives of up to 2% by mass. In this respect it has also proved advantageous if the masking agent is subjected to intimate admixture with the polyester. A particularly advantageous factor is that the masking agent is effective in a wide temperature range of 120° to 250° C. The various physical properties of the stabilizable, amorphous and partly crystalline polyesters require, due to their melting or softening temperatures varying between these limits, such a temperature range for the effective application of stabilization.

Furthermore, additives such as fillers, reinforcing materials, nucleation or delustering agents may be added to the masking agent according to the invention.

The procedure according to the invention is particularly suitable for melt stabilization for all polyester melts containing tin, titanium or zirconium, independently of the production of the polyester by ring opening polymerization or melt polycondensation and independently of its chemical structure. Preferred are the biodegradable homo-and copolyesters of lactic acid (homo-copolyactides) and of the 6-hydroxy-carboxylic acid (polycaprolactones) and the polybutylene terephthalates produced by melt polycondensation, which may be synthesized in the presence of the named initiators/stabilizers.

For the procedure described above, the masking agent is then added to the polyester melt in direct connection with the synthesis process or ring opening polymerisation or melt polycondensation, in the required quantity.

The procedure according to the invention may also be used in the regeneration of polyesters. For these cases of application, as above, the masking agent is added for the manufacturing process to the resultant polyester melt during the regeneration and if necessary distributed in the polyester melt by corresponding mechanical process steps. On the other hand, it is also possible however, during regeneration of the polyester, to add the masking agent in separate fabrication stages or before or during processing of the polyester; in dependence on the technology available, more appropriately the conventional apparatus with a high mixing intensity such as double-worm extruders or special kneaders, is used.

The invention further relates to a masking agent for carrying out the method. According to the invention the masking agent contains a compound which has at least one tropon ring. It is preferred in this respect if the masking agent contains tropon, α-tropolon, thujaplicin, purpurogallin or its derivatives or mixtures thereof. In this respect the masking agent may be added either in solid form or in solution.

The invention will be explained in more detail in the following with reference to examples:

In order to characterize the stabilization effectivity, the time history of the melt viscosity or a parameter proportional thereto is determined under thermal stress. According to the BUECHI-equation (Equation 1)

$$\eta = K \cdot M_w^{3.5}$$

K: constant $M_w$: weight agent or molecular mass the melt viscosity reacts very sensitively to the slightest alterations in the molar mass. This term applies with a polymer-dependent constant K and a small range of fluctuation of the exponent for all linear-chain polymers. According to (Equation 2)

$$\eta_{eff} = T/Y = K_{Brab} \cdot M_d/N$$

$\eta_{eff}$: melt viscosity [Pa*s]

T: transverse strain [Pa]

Y: deformation speed [s$^{-1}$]

$K_{Brab}$: apparatus constant of the Brabener Plasticorder W 50E used $M_d$: torque [NM]

N: median rotational speed [s$^{-1}$]

the torque is directly proportional to the viscosity. It can thus be determined both under synthesis and under fabrication or processing conditions at the individual reactors, extruders or kneaders in a continuous manner and thus may be used directly to characterise the behaviour of a polymer melt under the specific industrial and equipment conditions. Reductions in the molar mass of a linear-chain polymer, induced by decomposition processes, are rapidly and reliably indicated via the torque in otherwise constant parameters of apparatus and process (melt volume, speed of rotation, temperature). In the examples describing the invention, therefore, a double-worm measurement kneader (Brabender Plasticorder W 50E) is used to determine the progress of the melt viscosity over a period of time. In principle however, identical results are obtained with all other conventional methods, which are used directly or indirectly to determine the molar mass of polymers.

EXAMPLE 1

(Comparative Example)

40 g of a poly-L-lactide produced in the presence of 10$^{-4}$ mol/mol monomer unit tin (2) octonoate are melted down in a Brabender Plasticorder W 50E in air and the melt is intensively mixed at 200° C. or 220° C. and 60 rpm with air cooling. The torque $M_d$ applied to the double-worm mixer is continuously recorded over a period of 60 minutes. The reduction in torque is clearly recognisable from the values in Table 1.

TABLE 1

Time History of Torque on a Poly-L-Lactide
Melt at 200° C. and 220° C.
$M_d$ (O) about 9.5 Nm at 200° C.; $M_d$ (O) about 4.8 Nm at 220° C.

| t [min.] | $M_d$ at 200° C. [Nm] | $M_d$ at 220° C. [Nm] |
|---|---|---|
| 10 | 6.7 | 2.5 |
| 20 | 5.2 | 1.5 |
| 30 | 4.3 | 0.6 |
| 40 | 3.7 | 0.3 |
| 50 | 3.2 | 0.1 |
| 60 | 2.9 | 0.0 |

The reduction in torque $M_d$ of about 9.5 Nm after melting of the granulate to $M_d$=2.9 within 60 minutes at 200° C. corresponds to a reduction in molar mass of $M_n$=50.500 g/mol or $M_w$=100.000 g/mol to 37.000 or 79.000 g/mol.

EXAMPLE 2

40 g of a tin containing poly-L-lactide (tin content in accordance with Example 1: $10^{-4}$ mol/mol) are mixed with 0.3 g cyclo-hepta-3, 5, 7-triene-1-ol-2-on, and the mixture, in accordance with the example, is melted in the Brabender Plasticorder W 50E under air and mixed for 60 minutes intensively at 60 rpm. The history of the torque through time is shown in Table 2.

TABLE 2

Time History of torque in a stabilised Poly-L-lactide melt at 200° C.

| t [min.] | $M_d$ [Nm] |
|---|---|
| 10 | 7.1 |
| 20 | 7.4 |
| 30 | 7.4 |
| 40 | 7.3 |
| 50 | 6.6 |
| 60 | 6.5 |

The molar mass of the poly-L-lactide stabilised with cyclo-hepta-3, 5, 7-triene-1-01-2-on was practically unchanged in a period of 60 minutes at 200° C. with overflowing air. With initial values corresponding to Example 1, $M_n$=52.000 g/mol and $M_w$=95.000 g/mol after a thermal load period of 60 minutes.

EXAMPLES 3 to 6

In accordance with Example 2, tin containing poly-L-lactide was mixed with various quantities of stabiliser and exposed to other thermolysis temperatures.

The results obtained are assembled in Tables 3 and 4.

TABLE 3

Time History of Torque of a stabilised poly-L-lactide melt at 200° C. in the presence of Various Stabiliser Concentrations

| t [min.] | 5 (1.25%) $M_d$ [Nm] | Ex. 3 (0.1%) $M_d$ [Nm] | Ex. 4 (0.25%) $M_d$ [Nm] | Ex. $M_d$ [Nm] |
|---|---|---|---|---|
| 5 | 6.8 | 6.8 | | |
| 10 | 7.2 | 7.3 | 7.1 | |
| 15 | 7.0 | 7.1 | | |
| 20 | 6.5 | 7.1 | 7.4 | |
| 30 | | 5.8 | 7.4 | |

TABLE 3-continued

Time History of Torque of a stabilised poly-L-lactide melt at 200° C. in the presence of Various Stabiliser Concentrations

| t [min.] | 5 (1.25%) $M_d$ [Nm] | Ex. 3 (0.1%) $M_d$ [Nm] | Ex. 4 (0.25%) $M_d$ [Nm] | Ex. $M_d$ [Nm] |
|---|---|---|---|---|
| 40 | | | | 7.4 |
| 50 | | | | 7.0 |
| 60 | | | | 7.0 |

TABLE 4

Time History of Torque of a stabilised poly-L-lactide Melt at 220° C.

| t [min.] | Example 6 (1.25%) $M_d$ [Nm] |
|---|---|
| 10 | 4.1 |
| 20 | 4.2 |
| 30 | 4.0 |
| 40 | 3.8 |
| 50 | 3.3 |
| 60 | 2.7 |

EXAMPLES 7 and 8

For determination of the stabiliser influence on thermally stressed melts of polycaprolacton (PCL), produced by ring opening polymerisation of the caprolactan initiated by tin oxtonoate, the melt viscosity of the polymer melt was investigated directly by means of a rheometer RHEOLAB of the Company Physica at 180° C., using a cone-plate system.

TABLE 5

Time History of the Melt Viscosity of unstabilised and of stabilised polycaprolacton Melts at 180° C.

| t [s] | Ex. 7 unstab. PCL Y [PA*s] | Ex. 8 stab. PCL Y [Pa*s] |
|---|---|---|
| 100 | 5.80 | 10.25 |
| 200 | 4.75 | 11.25 |
| 300 | 4.05 | 11.75 |
| 400 | 3.55 | 12.75 |
| 500 | 3.10 | 12.50 |
| 600 | 2.80 | 13.50 |

EXAMPLES 9 and 10

40 g of a polybutylene terephthalate (PBTP) produced in the presence of titanium-tetra-butylate ($3*10^{-4}$ mol/mol) are intimately mixed with 0.4 g cyclo-hepta-3, 5, 7-triene-1-ol-2-on, and this mixture is thermally stressed at 240° C. in the double-worm mixer over a period of 40 minutes. For comparison, the same polyester material was investigated under the same conditions without the addition of stabiliser. The results are assembled in Table 6.

TABLE 6

Time History of Torque of an unstabilised and of a stabilised PBTP melt at 240° C.

| t [min.] | Ex. 9 unstab. PBTP $M_d$ [Nm] | Ex. 10 stab. PBTP $M_d$ [Nm] |
|---|---|---|
| 10 | 7.5 | 7.5 |
| 20 | 5.2 | 6.8 |
| 30 | 4.0 | 5.0 |
| 40 | 3.0 | 4.1 |

We claim:

1. A method of stabilizing a melt viscosity of at least one of aliphatic polyesters, aromatic polyesters, and aliphatic-aromatic copolyesters containing at least one of catalysts and initiators, comprising:
adding a masking agent to a melt resulting during one of synthesis of polyesters and regeneration of polyesters, said masking agent comprising a compound selected from the group consisting of tropon, α-tropolon, thujaplicin, purpurogallin, and mixtures thereof.

2. The method of claim 1, wherein the masking agent is used in excess of the at least one of catalysts and initiators, and wherein the masking agent is present up to 2% by mass.

3. The method of claim 1, wherein the masking agent is intimately mixed with the polyesters.

4. The method of claim 2, wherein the masking agent is intimately mixed with the polyesters.

5. The method of claim 1, further comprising adding to the masking agent at least one member selected from the group consisting of fillers, reinforcing materials, nucleation agents, and delustering agents.

6. The method of claim 2, further comprising adding to the masking agent at least one member selected from the group consisting of fillers, reinforcing materials, nucleation agents, and delustering agents.

7. The method of claim 1, wherein the masking agent is added to the polyester melt during regeneration of the polyesters.

8. The method of claim 1, wherein the masking agent is added during a period selected from the group consisting of before regeneration of the polyesters and during regeneration of the polyesters.

9. The method of claim 1, wherein the polyesters are produced by one of ring opening polymerization and melt polycondensation in the presence of at least one of initiators and catalysts.

10. The method of claim 1, wherein the masking agent comprises tropon.

11. The method of claim 1, wherein the masking agent comprises α-tropolon.

12. The method of claim 1, wherein the masking agent comprises thujaplicin.

13. The method of claim 1, wherein the masking agent comprises purpurogallin.

* * * * *